(12) United States Patent
Tomick et al.

(10) Patent No.: US 12,545,412 B2
(45) Date of Patent: Feb. 10, 2026

(54) OPTICAL TIP TIMING SENSOR USED FOR BLADE-TIP DEICING

(71) Applicant: RTX Corporation, Farmington, CT (US)

(72) Inventors: Hunter Tomick, Lebanon, CT (US); Eli Warren, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/762,287

(22) Filed: Jul. 2, 2024

(65) Prior Publication Data

US 2026/0008549 A1    Jan. 8, 2026

(51) Int. Cl.
*B64D 15/22* (2006.01)

(52) U.S. Cl.
CPC .................................. *B64D 15/22* (2013.01)

(58) Field of Classification Search
CPC ......... B64D 15/12; F01D 25/02; F02C 7/047; F03D 80/40; F03D 80/401; F03D 80/405; F03D 17/002; F05B 2270/804
See application file for complete search history.

(56) References Cited

U.S. PATENT DOCUMENTS

| 5,206,816 | A | 4/1993 | Hill et al. | |
|---|---|---|---|---|
| 10,429,511 | B2 * | 10/2019 | Bosetti | G01S 17/95 |
| 11,686,213 | B2 * | 6/2023 | El Haloui | B64F 5/00 |
| | | | | 416/61 |
| 2010/0054935 | A1 * | 3/2010 | Olesen | G01D 5/35303 |
| | | | | 416/61 |
| 2014/0263260 | A1 * | 9/2014 | Duncan | E01H 5/106 |
| | | | | 219/490 |
| 2015/0345325 | A1 | 12/2015 | Khibnik | |

FOREIGN PATENT DOCUMENTS

| DE | 102021102659 B3 * | 2/2022 | B64D 15/22 |
|---|---|---|---|
| DK | 3120020 T3 * | 11/2018 | F03D 1/06 |
| RU | 2815119 C1 | 3/2024 | |
| WO | WO-2014166496 A1 * | 10/2014 | F03D 17/00 |

OTHER PUBLICATIONS

European Search Report dated Dec. 3, 2025, in connection with European Application No. 25187061.4, 8 pages.

* cited by examiner

*Primary Examiner* — Courtney D Heinle
*Assistant Examiner* — Ryan C Clark

(57) ABSTRACT

An apparatus includes an optical sensor and at least one controller operably coupled to the optical sensor. The optical sensor is configured to detect a time of arrival (TOA) of a blade while operating in a TOA mode. The at least one controller is configured to determine that conditions on a tip of the blade are subject to icing while the optical sensor is operating in the TOA mode. The at least one controller is also configured to control the optical sensor to operate in a deicing mode to increase power of the optical sensor and heat the tip of the blade.

20 Claims, 4 Drawing Sheets

OPTICAL TIP TIMING SENSOR USED FOR BLADE-TIP DEICING

TECHNICAL FIELD

This disclosure relates generally to flight systems. More specifically, this disclosure relates to an optical tip timing sensor used for blade-tip deicing.

BACKGROUND

Some jet turbine engines include a system for deicing fan blades to prevent imbalance and vibration issues associated with added mass of accumulated ice. However, these systems typically do not directly heat blade tips where ice accumulation could cause significant problems.

SUMMARY

This disclosure provides an optical tip timing sensor used for blade-tip deicing.

In a first embodiment, an apparatus includes an optical sensor and at least one controller operably coupled to the optical sensor. The optical sensor is configured to detect a time of arrival (TOA) of a blade while operating in a TOA mode. The at least one controller is configured to determine that conditions on a tip of the blade are subject to icing while the optical sensor is operating in the TOA mode. The at least one controller is also configured to control the optical sensor to operate in a deicing mode to increase power of the optical sensor and heat the tip of the blade.

Any single one or any combination of the following features may be used with the first embodiment. The at least one controller may be configured to determine that the tip of the blade is subject to icing based on an analysis of a rotation speed of the blade using data captured by the optical sensor. The at least one controller may be configured to determine that the tip of the blade is subject to icing based on an analysis of a vibration of the blade using data captured by the optical sensor. To control the optical sensor in the deicing mode, the at least one controller may be configured to alternate between operating the optical sensor in the TOA mode and the deicing mode. The optical sensor may be aligned with a leading surface of the blade. The optical sensor may be oriented at an angle with respect to a leading surface of the blade. The at least one controller may be further configured to determine that the tip of the blade is no longer subject to icing while the optical sensor is operating in the deicing mode and control the optical sensor to operate in the TOA mode.

In a second embodiment, a fan blade system includes a plurality of blades, an optical sensor, and at least one controller operably coupled to the optical sensor. The blades are configured to rotate around a hub. The optical sensor is configured to detect a TOA of a specified one of the blades while operating in a TOA mode. The at least one controller is configured to determine that conditions on a tip of the specified blade are subject to icing while the optical sensor is operating in the TOA mode. The at least one controller is also configured to control the optical sensor to operate in a deicing mode to increase power of the optical sensor and heat the tip of the blade.

Any single one or any combination of the following features may be used with the second embodiment. The at least one controller may be configured to determine that the tip of the specified blade is subject to icing based on an analysis of a rotation speed of the specified blade using data captured by the optical sensor. The at least one controller may be configured to determine that the tip of the specified blade is subject to icing based on an analysis of a vibration of the specified blade using data captured by the optical sensor. To control the optical sensor in the deicing mode, the at least one controller may be configured to alternate between operating the optical sensor in the TOA mode and the deicing mode. The optical sensor may be aligned with a leading surface of the specified blade. The optical sensor may be oriented at an angle with respect to a leading surface of the specified blade. The at least one controller may be further configured to determine that the tip of the blade is no longer subject to icing while the optical sensor is operating in the deicing mode and control the optical sensor to operate in the TOA mode.

In a third embodiment, a method includes detecting, using an optical sensor, a TOA of a blade while operating in a TOA mode The method also includes determining, using at least one controller operably coupled to the optical sensor, that conditions on a tip of the blade are subject to icing while the optical sensor is operating in the TOA mode. The method further includes controlling, using the at least one controller, the optical sensor to operate in a deicing mode to increase power of the optical sensor and heat the tip of the blade.

Any single one or any combination of the following features may be used with the third embodiment. Determining that the conditions on the tip of the blade are subject to icing may include determining that the tip of the blade is subject to icing based on an analysis of a rotation speed of the blade using data captured by the optical sensor. Determining that the conditions on the tip of the blade are subject to icing may include determining that the tip of the blade is subject to icing based on an analysis of a vibration of the blade using data captured by the optical sensor. Controlling the optical sensor in the deicing mode may include alternating between operating the optical sensor in the TOA mode and the deicing mode. The optical sensor may be aligned with a leading surface of the blade. The optical sensor may be oriented at an angle with respect to a leading surface of the blade.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
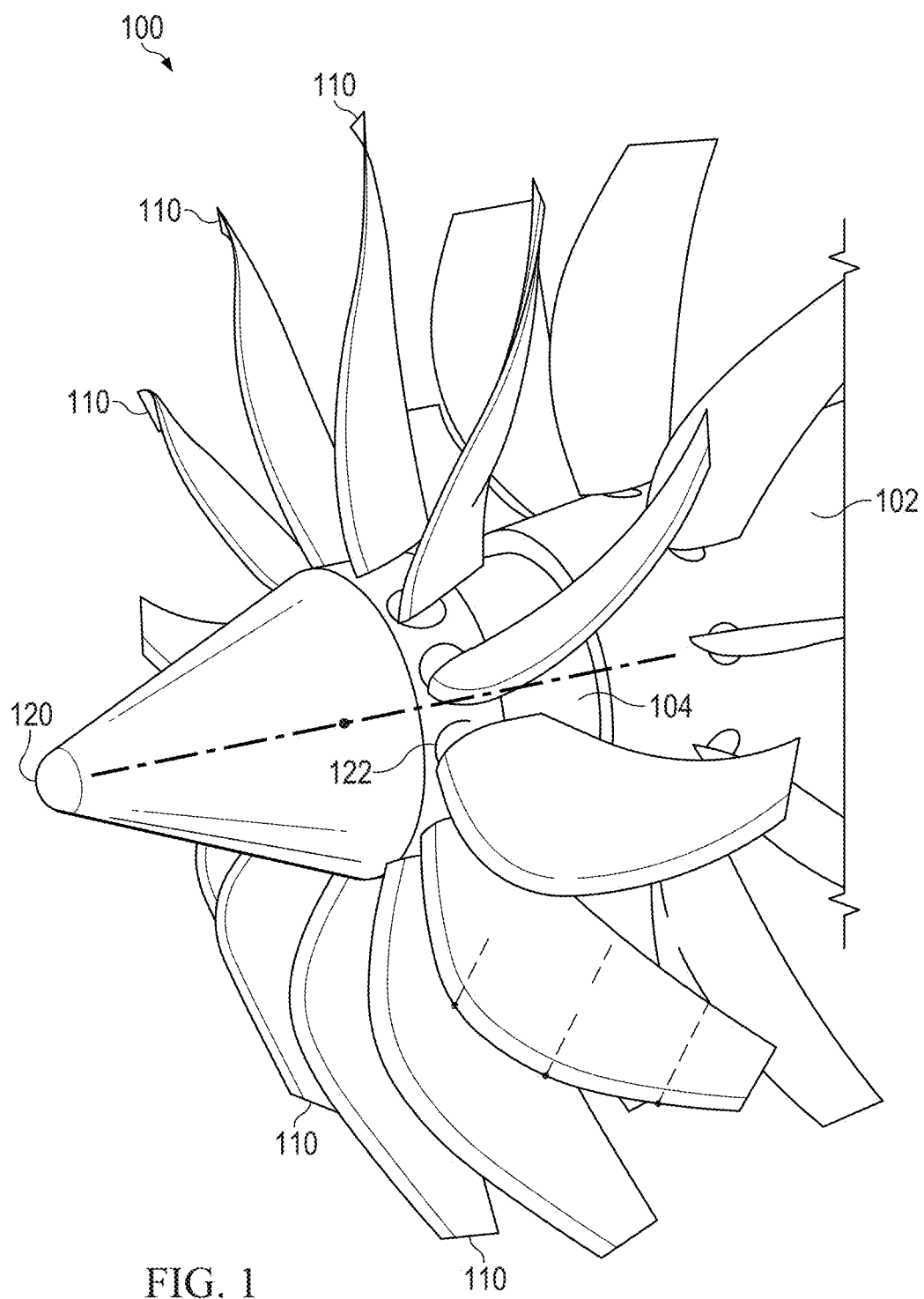
FIG. 1 illustrates an example fan blade system configured to mitigate the impact of an icing event on a blade tip in accordance with this disclosure.
Figure 2A:
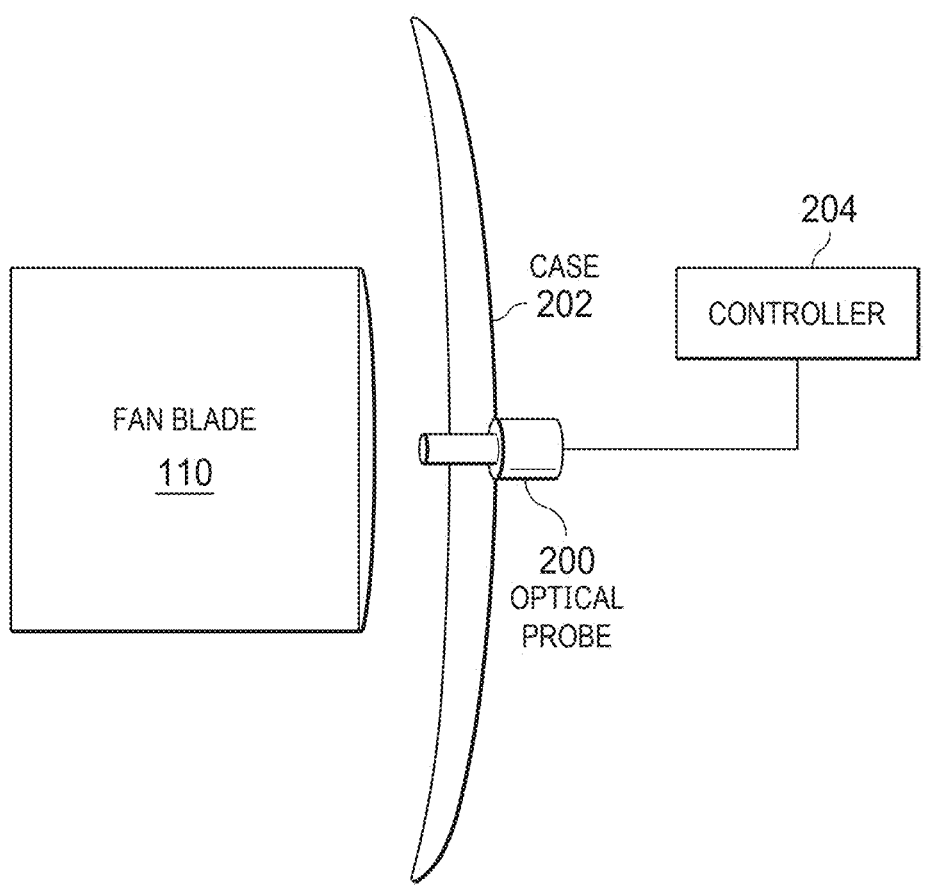
FIGS. 2A through 2E illustrate an example optical tip timing sensor used for blade-tip anti-icing in accordance with this disclosure.
Figure 2B:
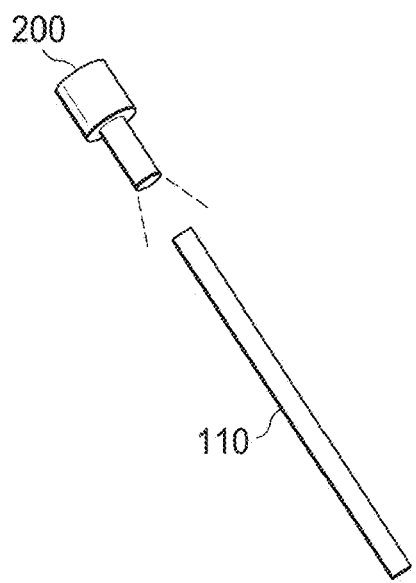
Figure 2C:
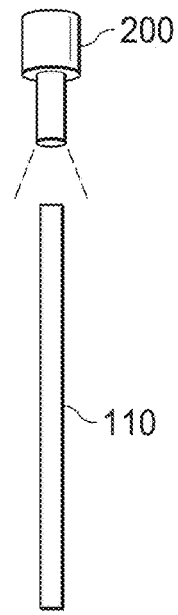
Figure 2D:
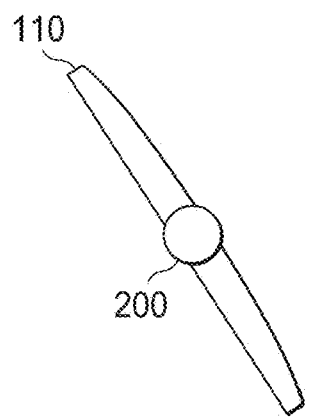
Figure 2E:
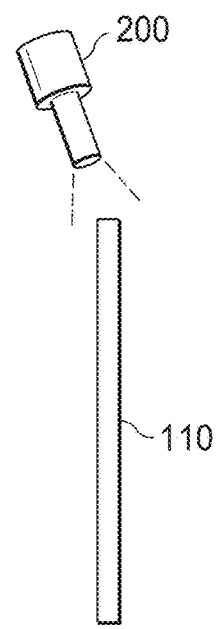
Figure 3:
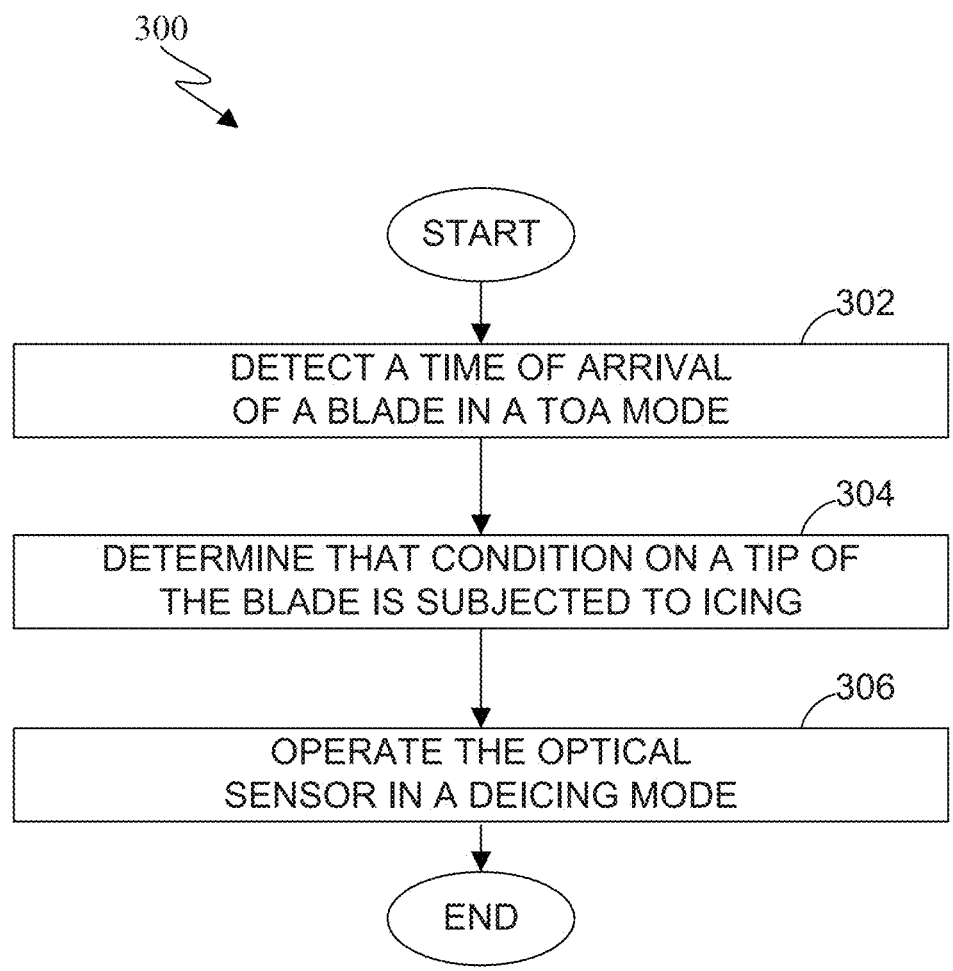
FIG. 3 illustrates an example method for deicing a blade-tip using an optical tip timing sensor in accordance with this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, some jet turbine engines include a system for deicing fan blades to prevent imbalance and vibration issues associated with added mass of accumulated ice. However, these systems typically do not directly heat blade tips where ice accumulation could cause significant problems. This disclosure provides an optical tip timing sensor that can be used for one or more timing functions as well as being used for blade-tip deicing.

FIG. 1 illustrates an example fan blade system 100 configured to mitigate the impact of an icing event on a blade tip using an optical tip timing sensor in accordance with this disclosure. In some embodiments, the fan blade system 100 can be part of an open rotor gas turbine engine 102, such as an open rotor engine of an aircraft, which may include a gearbox 104. As particular examples, the fan blade system 100 can have a puller configuration located at the front of a nacelle or can include a pusher fan blade system located at the rear of a nacelle.

The multiple fan blades 110 are connected to a hub 120 at points of attachment 122, respectively. The fan blades 110 can be affixed to or be integral with the hub 120, such that the fan blades 110 extend radially from the hub. That is, the fan blade system 100 includes the hub 120 that can be rotated, for example, driven by a shaft that is driven by a turbine of a gas turbine engine. As another example, additionally or alternatively, the fan blade system 100 may be driven by a shaft that is driven by an electric motor. The hub 120 and attached fan blades 110 rotate together, in unison.

Although FIG. 1 illustrates one example of a fan blade system 100 configured to mitigate the impact of an icing event on a blade tip, various changes may be made to FIG. 1. For example, the fan blade system 100 may include any desired number of fan blades 110.

FIGS. 2A through 2E illustrate an example optical tip timing sensor 200 used for blade-tip deicing in accordance with this disclosure. In particular, FIG. 2A illustrates a front view of the timing sensor 200 and fan blade 110, FIG. 2B illustrates an inward view of the timing sensor 200 and fan blade 110, FIG. 2C illustrates a projected view of the timing sensor 200 and fan blade 110, FIG. 2D illustrates a rotated view of FIG. 2C, and FIG. 2E illustrates a projected view of the timing sensor 200 and fan blade 110 with the timing sensor 200 tilted.

Some jet turbines engines use TOA sensors 200 mounted on the case 202 to monitor blade-tip health and vibrations in the fan blades 110. An option for blade tip timing is to use optical probes and lasers. While most tip timing optical probes use low-power (such as less than 1 W) lasers, the tip timing optical probes can be controlled to operate with higher power while in a deicing mode, then return to lower power for a TOA mode.

As shown in FIG. 2A through 2E, one or more of the timing sensors 200 can employ optical means to detect the presence or the passing of a fan blade 110 relative thereto. More specifically, each timing sensor 200 may include an emitter or an optic source configured to emit light towards the fan blades 110, or the tips thereof, as well as an optical detector configured to detect any light that may be reflected by a fan blade 110 passing in proximity thereto. The timing sensors 200 may further be configured to discern the degree of proximity of each passing fan blade 110 based on the magnitude of light that is received and detected. For example, each timing sensor 200 may output a continuous analog voltage or current signal to the controller 204 which varies, such as in the form of the signal phase, amplitude and/or frequency, according to the amount of light that is detected. In turn, the controller 204 may compare these variations to predefined thresholds to determine the corresponding proximity of, or at least the presence of, each fan blade 110 as the rotor rotates within the gas turbine engine 102.

The controller 204 can determine that ice is forming or that the tip of the blade is approaching conditions that would allow for ice formations. The controller 204 can use the optical sensor 200 to identify ice formation on a fan blade 110. The controller 204 can analyze an image captured by the optical sensor 200, data captured by the optical sensor 200, data captured by other sensors, or any other suitable method for determining that ice is formed on the tip of the blade 110 or is in condition for ice to form on the tip of the blade 110. For example, the controller 204 can identify that the blade is vibrating excessively or rotating slower than an expected rotation speed of a blade. As shown in FIG. 2E, a sensor 200 can be arranged at an angle compared to a leading surface of the blade to capture data on the leading surface. For example, an image or temperature can be captured on the leading surface of the blade in addition to the blade tip.

The controller 204 can control the sensor 200 to operate in a deicing mode. In the deicing mode, the sensor 200 can be controlled to operate at a power higher than a typical operating power of the sensor in the TOA mode. The extra power supplied to the sensor 200 creates a stronger magnitude of light that could be used to heat the blade tip. In certain embodiments, the controller 204 can be configured to routinely switch the sensor 200 between TOA mode and deicing mode. The controller 204 could cause the sensor 200 to operate in TOA mode for a first period and in the deicing mode for a second period.

Although FIGS. 2A through 2E illustrate an example optical tip timing sensor 200 used for blade-tip deicing, various changes may be made to FIGS. 2A through 2E. For example, various components in FIGS. 2A through 2E may be combined, further subdivided, replicated, omitted, or rearranged and additional components may be added according to particular needs. For example, the optical tip timing sensor 200 could be replaced with a different type of optical sensor.

FIG. 3 illustrates an example method 300 for deicing a blade-tip using an optical tip timing sensor 200 in accordance with this disclosure. For ease of explanation, the method 300 of FIG. 3 is described as being performed using the timing sensor 200 and controller 204 of FIG. 2. However, the method 300 may be used with any other suitable system and any other suitable optical sensor.

As shown in FIG. 3, the controller 204 can control the optical sensor 200 to detect a TOA of a blade while operating in a TOA mode at step 302. The optical sensor 200 can operate at a normal operating power, such as less than 1 W. The normal operating power of the optical sensor 200 does not provide substantial heat to avoid icing at a tip of a blade 110.

The controller determines that a condition on a tip of the blade is subject to icing at step 304. The controller 204 detects that the fan blade system 100 is operating in a condition where icing may occur while the optical sensor is operating in a TOA mode. The controller 204 can detect that the blade tip is experiencing icing. The controller 204 can identify that a fan blade 110 is not operating within tolerances of rotation and vibration of the fan blade 110. The controller can identify, based on data from other sensors, such as a pressure sensor, a temperature sensor, etc., that icing may occur.

The controller 204 can operate the optical sensor in a deicing mode at step 306. The controller 204 can switch to operating the optical sensor in a deicing mode. The controller 204 can control the optical sensor to operate a power higher than the power level for a TOA mode. In certain embodiments, the sensor 200 is maintained in the deicing mode until the controller determines that the conditions of the blade tip are no longer suitable for icing and can switch back to the TOA mode until the conditions are detected again. In some embodiments, the controller 204 can alternate between operating the sensor 200 in the TOA mode for a first period of time and the deicing mode for a second period of time.

Although FIG. 3 illustrates one example of a method 300 for deicing a blade-tip using an optical tip timing sensor, various changes may be made to FIG. 3. For example, while shown as a series of steps, various steps in FIG. 3 may overlap, occur in parallel, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    an optical sensor configured to detect a time of arrival (TOA) of a blade while operating in a TOA mode by emitting light towards the blade and detecting any light that may be reflected by the blade passing in proximity to the emitted light; and
    at least one controller operably coupled to the optical sensor, the at least one controller configured to:
        determine that conditions on a tip of the blade are subject to icing while the optical sensor is operating in the TOA mode; and
        control the optical sensor to operate in a deicing mode to increase power of the light emitted towards the blade and heat the tip of the blade.

2. The apparatus of claim 1, wherein the at least one controller is configured to determine that the tip of the blade is subject to icing based on an analysis of a rotation speed of the blade using data captured by the optical sensor.

3. The apparatus of claim 1, wherein the at least one controller is configured to determine that the tip of the blade is subject to icing based on an analysis of a vibration of the blade using data captured by the optical sensor.

4. The apparatus of claim 1, wherein, to control the optical sensor in the deicing mode, the at least one controller is configured to alternate between operating the optical sensor in the TOA mode and the deicing mode.

5. The apparatus of claim 1, wherein the optical sensor is aligned with a leading surface of the blade.

6. The apparatus of claim 1, wherein the optical sensor is oriented at an angle with respect to a leading surface of the blade.

7. The apparatus of claim 1, wherein the at least one controller is further configured to:
    determine that the tip of the blade is no longer subject to icing while the optical sensor is operating in the deicing mode; and
    control the optical sensor to operate in the TOA mode.

8. A fan blade system comprising:
    a plurality of blades configured to rotate around a hub;
    an optical sensor configured to detect a time of arrival (TOA) of a specified one of the blades while operating in a TOA mode by emitting light towards the specified blade and detecting any light that may be reflected by the specified blade passing in proximity to the emitted light; and
    at least one controller operably coupled to the optical sensor, the at least one controller configured to:
        determine that conditions on a tip of the specified blade are subject to icing while the optical sensor is operating in the TOA mode; and
        control the optical sensor to operate in a deicing mode to increase power of the light emitted towards the specified blade and heat the tip of the specified blade.

9. The fan blade system of claim 8, wherein the at least one controller is configured to determine that the tip of the specified blade is subject to icing based on an analysis of a rotation speed of the specified blade using data captured by the optical sensor.

10. The fan blade system of claim 8, wherein the at least one controller is configured to determine that the tip of the specified blade is subject to icing based on an analysis of a vibration of the specified blade using data captured by the optical sensor.

11. The fan blade system of claim 8, wherein, to control the optical sensor in the deicing mode, the at least one controller is configured to alternate between operating the optical sensor in the TOA mode and the deicing mode.

12. The fan blade system of claim 8, wherein the optical sensor is aligned with a leading surface of the specified blade.

13. The fan blade system of claim 8, wherein the optical sensor is oriented at an angle with respect to a leading surface of the specified blade.

14. The fan blade system of claim 8, wherein the at least one controller is further configured to:
   determine that the tip of the blade is no longer subject to icing while the optical sensor is operating in the deicing mode; and
   control the optical sensor to operate in the TOA mode.

15. A method comprising:
   detecting, using an optical sensor, a time of arrival (TOA) of a blade while operating in a TOA mode by emitting light towards the blade and detecting any light that may be reflected by the blade passing in proximity to the emitted light;
   determining, using at least one controller operably coupled to the optical sensor, that conditions on a tip of the blade are subject to icing while the optical sensor is operating in the TOA mode; and
   controlling, using the at least one controller, the optical sensor to operate in a deicing mode to increase power of the light emitted towards the blade and heat the tip of the blade.

16. The method of claim 15, wherein determining that the conditions on the tip of the blade are subject to icing comprises:
   determining that the tip of the blade is subject to icing based on an analysis of a rotation speed of the blade using data captured by the optical sensor.

17. The method of claim 15, wherein determining that the conditions on the tip of the blade are subject to icing comprises:
   determining that the tip of the blade is subject to icing based on an analysis of a vibration of the blade using data captured by the optical sensor.

18. The method of claim 15, wherein controlling the optical sensor in the deicing mode comprises:
   alternating between operating the optical sensor in the TOA mode and the deicing mode.

19. The method of claim 15, wherein the optical sensor is aligned with a leading surface of the blade.

20. The method of claim 15, wherein the optical sensor is oriented at an angle with respect to a leading surface of the blade.

* * * * *